No. 891,305. PATENTED JUNE 23, 1908.
P. VALLIERE.
TOWEL RACK.
APPLICATION FILED OCT. 3, 1905.
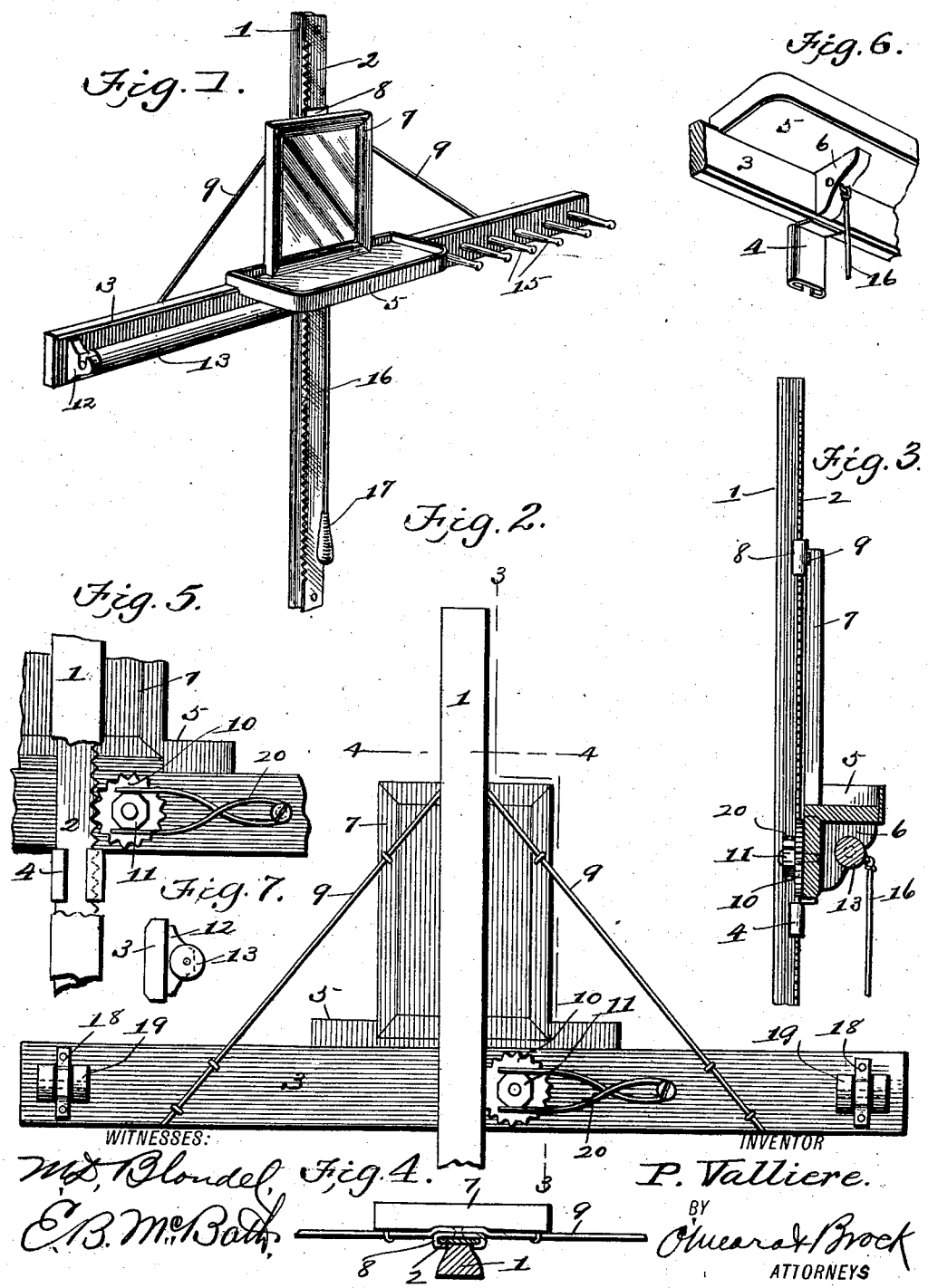
WITNESSES: INVENTOR
P. Valliere.
BY
ATTORNEYS

UNITED STATES PATENT OFFICE.

PHILLIPE VALLIERE, OF LAWRENCE, MASSACHUSETTS.

TOWEL-RACK.

No. 891,305.  Specification of Letters Patent.  Patented June 23, 1908.

Application filed October 3, 1905. Serial No. 281,150.

*To all whom it may concern:*

Be it known that I, PHILLIPE VALLIERE, a citizen of the United States, residing at Lawrence, in the county of Essex and the State of Massachusetts, have invented a new and useful Improvement in Towel-Racks, of which the following is a specification.

This invention relates to a towel rack carrying a comb tray and mirror all of which are vertically adjustable on a rack bar.

The invention consists of the novel features of construction, and combination of parts hereinafter described, pointed out in the claims and shown in the accompanying drawings, in which:

Figure 1 is a perspective view of the device. Fig. 2 is a rear elevation. Fig. 3 is a section on the line 3—3 of the Fig. 2. Fig. 4 is a section on the line 4—4 of Fig. 2. Fig. 5 is a detail elevation of the portion of the back of the device and vertical bar being broken away to show a rack bar and guide clip. Fig. 6 is a partially inverted perspective view showing the portion of the towel rack bar and the comb tray. Fig. 7 is a detail view of the towel roller support.

In these drawings 1 represents a vertical bar beveled on opposite sides, as shown in Fig. 4, and upon the outer face of the said bar is secured a vertical rack bar 2, the side edges of which project laterally beyond the side edges of the bar 1. A horizontal bar 3 is provided mid-way its ends with a metal flanged, depending guide clip 4, the flanges of which fit loosely over the side edges of the rack bar 2 so that the clip 4 slides loosely along said rack bar and acts as a guide for the horizontal bar 3. Upon the upper edge of the bar 3, mid-way the ends of the bar, is a comb tray 5 braced in position upon the bar 3 by bracket 6. A mirror 7 is mounted in an upright position upon the rear edge of the comb tray 5, and at its upper end and upon its rear face carries a flange guide clip 8 which is in vertical alinement with the guide clip 4, and substantially of the same material. A V-shaped brace rod 9 has its diverging free ends secured to the back of the bar 3 and the apex of the brace rod 9 is secured to the back of the mirror 7. Upon the back of the bar 3 is mounted a ratchet pinion 10 which engages the rack bar 2. Rotation of the ratchet pinion 10 is regulated by a nut 11 which bears upon the face of the ratchet pinion, and which when tightened to a sufficient degree, as to entirely prevent rotation of the ratchet pinion will firmly lock the bar 3 to the rack bar 2. A figure 8 spring has one end secured to the back of the bar 3 and its free ends rest upon opposite sides of the nut 11, and prevents accidental loosening of the said nut. Upon the front face of the bar 3 and adjacent one end, is a bracket 12 and journaled in this bracket and in the bracket 6 is a rotatable towel roller 13 and upon the opposite end portion of the bar 3 is arranged a plurality of pegs 15. A cord 16 provided with a handle 17 is attached to the bracket 6 by means of which the bar 3 may be drawn downward along the rack bar 2, being understood that the ratchet pinion 10, is not usually locked absolutely against rotation but only to an extent sufficient to prevent accidental falling of the towel rack from its adjusted position. By means of this construction the rack, comb tray, and mirror can be readily adjusted to the desired height.

To the back of the bar 3 are secured brackets 18 which carry rollers 19, these rollers traveling on the wall to which the bar 1 is secured.

Having thus fully described my invention what I claim as new and desire to secure by Letters Patent is:

A device of the kind described comprising a vertical rack bar, a horizontal bar, a flanged guide clip carried by the horizontal bar, the said flanges fitting loosely over the said edges of the rack bar, a mirror carried by the horizontal bar, a flanged guide clip carried by the back of the mirror in alinement with the first mentioned clip and also in sliding engagement with the rack bar, a ratchet pinion carried by the horizontal bar and in engagement with the rack bar, and means for locking the said ratchet pinion against rotation in either direction.

PHILLIPE VALLIERE

Witnesses:
ONESIME LALIBERTE,
JOSEPH MONETTE.